(No Model.)
H. L. SHERWOOD.
BICYCLE.
No. 514,782. Patented Feb. 13, 1894.
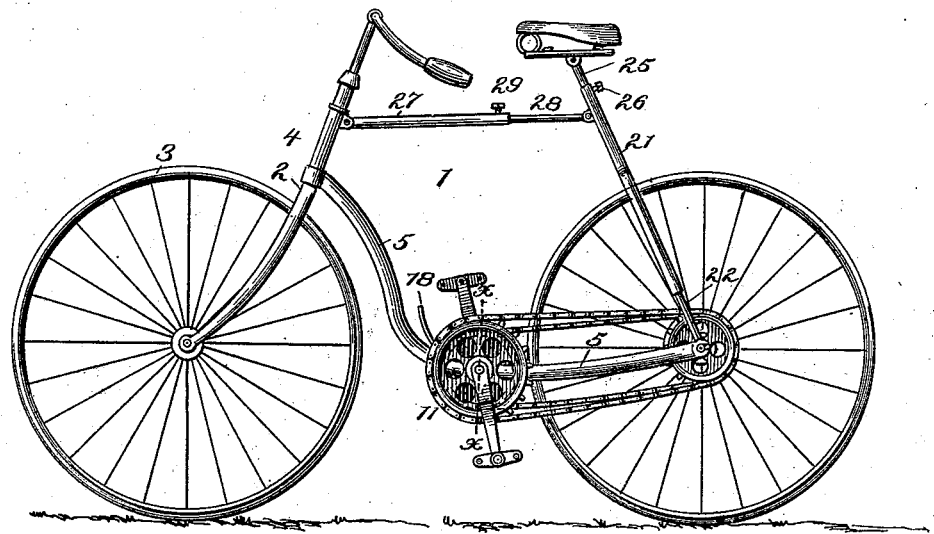
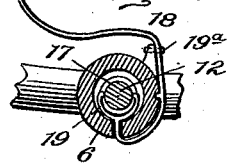
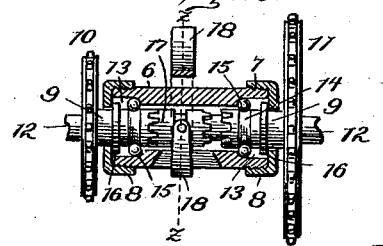
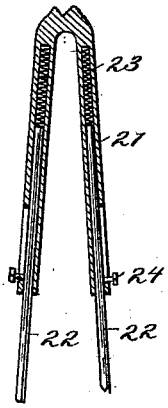
Witnesses
Edwin L. Bradford
Theo. L. Gatchel
Inventor
Henry L. Sherwood
by V. D. Stockbridge & Son.
Attorneys

UNITED STATES PATENT OFFICE.

HENRY L. SHERWOOD, OF WASHINGTON, DISTRICT OF COLUMBIA.

BICYCLE.

SPECIFICATION forming part of Letters Patent No. 514,782, dated February 13, 1894.

Application filed October 5, 1892. Serial No. 447,887. (No model.)

*To all whom it may concern:*

Be it known that I, HENRY L. SHERWOOD, a citizen of the United States, residing in the city of Washington, District of Columbia, have invented certain new and useful Improvements in Bicycles; and I do hereby declare that the following is a full, clear, and exact description of the invention, such as will enable others skilled in the art to which it appertains to make and use the same.

My invention relates to improvements in bicycles, and it has for its object to provide for changing the gearing by means of which motion is imparted from the pedal shaft to the driving shaft conveniently and expeditiously, so as to obtain power or speed, as may be desired, and as circumstances may require; also to provide for conveniently changing the position of the seat to adapt the bicycle to level or up and down hill travel; as more fully hereinafter set forth.

The above objects are attained by the means illustrated in the accompanying drawings, in which—

Figure 1, represents a side elevation of a bicycle embodying my invention. Fig. 2, represents a transverse section of a portion of the bicycle, taken on the line $x$—$x$ of Fig. 1. Fig. 3, represents a vertical sectional view of the rear or seat supporting portion of the bicycle frame, showing the springs therein, to take up the jolting in riding over rough roads. Fig. 4, represents a sectional view taken on the line $z$—$z$ of Fig. 2, and Fig. 5, represents a rear view of the lower portion of the frame of the bicycle, showing the bifurcated arm in cross section.

1 indicates the frame of the bicycle. The forward section of the frame consists, as usual, of the bifurcated standard 2, the branching members of which straddle the forward wheel 3, and have bearings at their lower ends for the axle journal of said wheel. The upwardly-projecting shank at the crotch of said branches passes through a sleeve 4, from which extend the backwardly-extending branches of the frame.

6 indicates a sleeve mounted between the branches 5 at a convenient point, as indicated in Figs. 1 and 5. The said sleeve is screw-threaded at its opposite ends, as indicated at 7, and upon the screw-threaded ends are mounted internally-screw-threaded caps 8 having central bearings for the hubs 9 of the the sprocket-wheels 10 and 11 through which the pedal shaft 12 passes, the hubs of said sprocket-wheels being mounted loosely upon said shaft. The sleeve at each end is recessed internally, as indicated by the numeral 13, and the hub is annularly-grooved, as indicated by 14. In the grooves are located the balls 15, which, with the walls of the recessed ends of the sleeve, form ball-bearings for the hubs. To confine the hubs and limit their movement laterally, they are provided with fixed collars 16 which set within the recessed ends of the sleeve and bear against the inner faces of the caps before mentioned.

The pedal shaft, midway between its ends, is provided with a fixed collar or annulus 17 having gear teeth on its opposite sides or edges, and the hubs of the respective sprocket wheels on their inner edges are provided with similar teeth which may be made to intergear with the teeth of either sprocket wheel hub, as hereinafter described. The sleeve at the ends of the bifurcated branch is slotted longitudinally, below, and into said slot extends the short upwardly bent end of a shifting foot lever 18, the said short arm being provided with a shifting arm 19 which sets into an annular groove in the fixed collar on the pedal shaft, so as to permit the collar to turn freely and at the same time to provide for shifting it laterally, so as to move the pedal shaft longitudinally through the hubs of the loosely mounted sprocket shafts and engage the teeth at opposite edges of the fixed collar with the teeth of either of the sprocket wheels at will to change the movement of the machine from power to speed or vice versa. The sprocket wheels of the pedal shaft are of different diameters, as are also the sprocket wheels on the driving or rear axle of the machine. The larger sprocket wheel of the pedal shaft is connected by a sprocket chain with the smaller sprocket wheel on the driving axle and vice versa. The long arm of the lever 18 which is fulcrumed at $19^a$, extends upwardly and is bent forwardly, as indicated in Fig. 4, so as to be conveniently operated by the rider of the machine.

5 is a bifurcated section of the main frame 1 of the machine which extends rearwardly from the standard 2 and straddles the sprocket wheels on the shaft or axle of the rear or driving wheel of the machine.

21 indicates the seat-supporting standard which is bifurcated and straddles the rear wheel. The branches of said standard are hollow and fit over the rods 22 which are pivoted to the rear axle at each side of the sprocket wheels thereon. Within the said branches, above the said rods are located spiral springs 23 which give an elastic bearing to the seat. The branches are slotted longitudinally near their lower ends for the passage of the stops 24 which are screwed into the rods 22 to limit the movement of the seat support. The upper part of the support is also made hollow, and into said upper portion is fitted the shank 25 of the seat which is adjustably held in place by means of a set-screw 26. To the forward standard 2 is pivoted a rearwardly extended tubular rod 27 into which telescopes a rod 28 pivoted to the seat-support 21. The rod 27 is provided with a set-screw 29 by means of which the seat may be adjusted backwardly or forwardly, to adapt the machine to travel over level or hilly ground, at pleasure.

The operation of the bicycle will be readily understood from the above description, as it will be seen that to change from power to speed or vice versa, it is only necessary to shift the pedal shaft to either side by means of the foot lever.

The seat, it will be perceived, is readily adjusted backwardly or forwardly, and as the seat is mounted upon spring supports, it affords an easy riding movement to the rider.

Having now described my invention, what I claim is—

1. The combination with the sleeve and pedal shaft, of the screw caps at the ends of the sleeve, the sprocket wheels having toothed hubs journaled therein, the fixed collars on said hubs bearing against the inner faces of the caps, the friction balls located in annular grooves in the hubs between the inner walls of the sleeve and said grooves, the toothed collar on the shaft, and the lever for shifting the same, substantially as described.

2. The combination of the bifurcated seat support pivotally mounted on the rear axle, a telescopic connection between the forward standard of the frame and the seat support, and means for locking the telescoping parts together, whereby the seat is readily adjusted backward and forward, substantially as described.

In testimony whereof I affix my signature in the presence of two witnesses.

HENRY L. SHERWOOD.

Witnesses:
V. D. STOCKBRIDGE,
THEO. L. GATCHEL.